(12) United States Patent
Takano et al.

(10) Patent No.: US 9,037,075 B2
(45) Date of Patent: May 19, 2015

(54) RELAY STATION AND COMMUNICATION CONTROL METHOD

(75) Inventors: Hiroaki Takano, Saitama (JP); Ryo Sawai, Tokyo (JP); Xin Guo, Beijing (CN)

(73) Assignee: SONY CORPORATION, Tokyo (JP)

( * ) Notice: Subject to any disclaimer, the term of this patent is extended or adjusted under 35 U.S.C. 154(b) by 298 days.

(21) Appl. No.: 13/583,135

(22) PCT Filed: Feb. 21, 2011

(86) PCT No.: PCT/JP2011/053705
§ 371 (c)(1),
(2), (4) Date: Oct. 5, 2012

(87) PCT Pub. No.: WO2011/114839
PCT Pub. Date: Sep. 22, 2011

(65) Prior Publication Data
US 2013/0017776 A1 Jan. 17, 2013

(30) Foreign Application Priority Data
Mar. 16, 2010 (JP) ................. P2010-059624

(51) Int. Cl.
*H04B 7/14* (2006.01)
*H04B 7/155* (2006.01)

(52) U.S. Cl.
CPC ............ *H04B 7/155* (2013.01); *H04B 7/15507* (2013.01)

(58) Field of Classification Search
CPC .... H04B 7/155; H04B 7/145; H04B 7/15507; H04B 7/15521; H04B 7/15557; H04B 7/15564; H04B 7/15585; H04B 7/15542

USPC ........... 455/7, 11.1, 9, 13.1, 41.2, 436, 414.1, 455/444, 96, 99, 446, 452.1, 437; 370/315, 370/15, 331, 329
See application file for complete search history.

(56) References Cited

U.S. PATENT DOCUMENTS 6,119,018 A * 9/2000 Kondo ........................ 455/522
8,254,928 B2 * 8/2012 Watanabe et al. ............. 455/436
(Continued)

FOREIGN PATENT DOCUMENTS

JP 2007-221527 A 8/2007
JP 2007-312244 A 11/2007
(Continued)

OTHER PUBLICATIONS

International Search Report issued May 24, 2011 in PCT/JP2011/053705 (English translation only).
(Continued)

*Primary Examiner* — Tan Trinh
(74) *Attorney, Agent, or Firm* — Oblon, McClelland, Maier & Neustadt, L.L.P.

(57) ABSTRACT

Provided is a relay station relaying wireless signals between a base station and a mobile station, the relay station including: a communication unit configured to relay the wireless signals; a determination unit configured to determine whether or not it is necessary to change a cell ID of the relay station in order to avoid a collision between a cell ID of the relay station and a cell ID of the base station due to a movement of the relay station; and a control unit configured to cause a cell ID of an access point of the mobile station belonging to the relay station to be changed from a first cell ID of the relay station to a second cell ID of the relay station when the determination unit determines that it is necessary to change the cell ID.

6 Claims, 14 Drawing Sheets

(56) References Cited

U.S. PATENT DOCUMENTS

| | | | |
|---|---|---|---|
| 8,559,952 B2* | 10/2013 | Frenger et al. | 455/436 |
| 2004/0252729 A1* | 12/2004 | Shinoda et al. | 370/546 |
| 2008/0031197 A1* | 2/2008 | Wang et al. | 370/331 |
| 2008/0291892 A1* | 11/2008 | Luo | 370/350 |
| 2009/0047955 A1 | 2/2009 | Frenger et al. | |
| 2009/0104911 A1* | 4/2009 | Watanabe et al. | 455/436 |
| 2010/0061339 A1* | 3/2010 | Kim et al. | 370/331 |
| 2010/0105395 A1* | 4/2010 | Ji et al. | 455/444 |
| 2010/0234071 A1* | 9/2010 | Shabtay et al. | 455/562.1 |
| 2010/0238855 A1* | 9/2010 | Yoshida et al. | 370/315 |
| 2011/0128916 A1* | 6/2011 | Kwon et al. | 370/328 |
| 2013/0010685 A1* | 1/2013 | Kim et al. | 370/315 |
| 2014/0120895 A1* | 5/2014 | Moe et al. | 455/418 |

FOREIGN PATENT DOCUMENTS

| | | |
|---|---|---|
| JP | 2011-35783 | 2/2011 |
| JP | 2011-35783 A | 2/2011 |

OTHER PUBLICATIONS

Qualcomm Europe, "Preference for Relay Operation in LTE-A", 3GPP TSG_RAN WG1 #56 R1-090876, Feb. 9, 2009, http://www.3gpp.org/ftp/tsg_ran/WG1_RL1/TSGR1_56/Docs/R1-090876.zip>.

Texas Instruments, On the Design of Relay Node for LTE-Advanced, 3GPP TSG RAN WG1 #56 R1-090593, Feb. 9, 2009, http://www.3gpp.org/ftp/tsg_ran/WG1_RL1/TSGR1_56/Docs/R1-090593.zip>.

Chinese Office Action issued Jul. 21, 2014, in China Patent Application No. 201180012789.7 (with English translation).

"On the design of relay node for LTE-advanced", Texas Instruments, 3GPP TSG RAN WG1 #56, R1-090593, Feb. 2009, 16 pages.

* cited by examiner

RELAY STATION AND COMMUNICATION CONTROL METHOD

TECHNICAL FIELD

The present invention relates to a relay station and a communication control method.

BACKGROUND ART

In recent years, as a technique for enlarging coverage of a wireless communication system, relay communication has been attracting attention (e.g., see Patent Literatures 1 and 2 below). In the relay communication, a relay station is disposed between two communication devices for which there is difficulty in directly transmitting and receiving wireless signals with good quality, and the wireless signals are relayed by the relay station. For example, in Long Term Evolution (LTE)-Advanced (hereinafter, referred to as an LTE-A) which is the next-generation cellular communication standard being planned by the Third Generation Partnership Project (3GPP), it is proposed that the throughput at a cell edge be enhanced using the relay communication of the relay station.

The relay communication in LTE-A is classified into two kinds known as type 1 and type 2. Type 1 is relay communication of the relay station to which the cell ID is allocated. The relay station of type 1 is treated as a base station in terms of a terminal device. On the other hand, type 2 is relay communication corresponding to operations of a repeater in wired communication by virtue of the relay station to which the cell ID is not allocated. The presence of the relay station of type 2 is typically not recognized by the terminal device.

The relay station playing a leading role in the relay communication may move by itself in a similar way to the mobile station. In particular, the fourth-generation (4G) cellular wireless communication mode represented by LTE-A is expected to have acceptable moving speeds of the mobile station and the relay station of up to 500 km/h. As a situation in which the movable relay station is used, for example, a situation in which the relay station is disposed in a train or a ship is considered. In this case, passengers and crews of the train or the ship use the mobile stations (e.g., terminals devices such as mobile PCs or smart phones) to carry out the wireless communication via the corresponding relay station.

CITATION LIST

Patent Literature

Patent Literature 1: JP 2007-312244A
Patent Literature 2: JP 2007-221527A

SUMMARY OF INVENTION

Technical Problem

However, when the relay station of type 2 is used in the situation mentioned above, since the mobile stations held by the users are substantially connected to a base station disposed outside the train or the ship, a handover frequently occurs in response to the movement of the relay station. In particular, when many passengers are present, the handovers occur almost at the same time due to the many mobile stations. This situation negatively affects not only the mobile stations within the moving means such as the train or the ship but also the throughput of the communication system outside the corresponding moving means, and is thus not preferable.

On the other hand, when the relay station of type 1 is used in the situation mentioned above, since the mobile station is connected to the corresponding relay station, the handover due to the mobile station does not necessarily occur. However, in this case, the collision between the cell ID allocated to the relay station and the cell ID of the nearby base station might occur in response to the movement of the relay station. The collision of the cell IDs means that two or more base stations or relay stations providing the service in an overlapping position use the same cell ID. Since the collision of the cell IDs causes the communication disturbance due to data interference, it is necessary to avoid the communication disturbance as much as possible.

The present invention thus provides a relay station and a communication control method which are novel and improved by avoiding a collision of cell IDs while suppressing the throughput from being decreased in a relay communication of the movable relay station.

Solution to Problem

According to the first aspect of the present invention in order to achieve the above-mentioned object, there is provided a relay station relaying wireless signals between a base station and a mobile station, the relay station including: a communication unit configured to relay the wireless signals; a determination unit configured to determine whether or not it is necessary to change a cell ID in order to avoid a collision between a cell ID of the relay station and a cell ID of the base station due to a movement of the relay station; and a control unit configured to cause a cell ID of an access point of the mobile station belonging to the relay station to be changed from a first cell ID to a second cell ID when the determination unit determines that it is necessary to change the cell ID.

When the determination unit is notified of a possibility of the collision of the cell IDs by a node that determines the possibility of the collision of the cell IDs based on position data of the relay station and cell ID data in which the cell ID and a position of the base station are associated with each other, the determination unit may determine that it is necessary to change the cell ID.

The relay station according to the first aspect of the present invention further includes: a position detection unit configured to detect a position of the relay station; and a storage unit configured to store cell ID data in which the cell ID and a position of the base station are associated with each other. When the determination unit determines that there is a possibility of the collision of the cell IDs based on the cell ID data stored in the storage unit and a position of the relay station detected by the position detection unit, the determination unit may determine that it is necessary to change the cell ID.

The determination unit may determine whether or not it is necessary to change the cell ID by monitoring a correlation between synchronization sequences and one or more cell IDs in the wireless signals received from nearby base stations.

The determination unit may determine that it is necessary to change the first cell ID that is a cell ID being used to the second cell ID that is a cell ID of which a correlation value reaches a maximum after a predetermined time has elapsed from a point of time at which the correlation value in the synchronization sequence of any of the cell IDs reaches the maximum.

The control unit may cause the cell ID of the access point of the mobile station to be changed from the first cell ID to the second cell ID by causing a synchronization signal in which a synchronization sequence corresponding to the first cell ID and a synchronization sequence corresponding to the second cell ID are multiplexed to be transmitted from the communication unit and causing a handover instruction from the first cell ID to the second cell ID to be transmitted from the communication unit to the mobile station.

The control unit may cause the communication unit to relay the wireless signal using the second cell ID after handover from the first cell ID to the second cell ID by the mobile station is completed.

According to the second aspect of the present invention in order to achieve the above-mentioned object, there is provided a communication control method using a relay station relaying wireless signals between a base station and a mobile station, the communication control method including: determining whether or not it is necessary to change a cell ID in order to avoid a collision between a cell ID of the relay station and a cell ID of the base station due to a movement of the relay station; and causing a cell ID of an access point of the mobile station belonging to the relay station to be changed from a first cell ID to a second cell ID when it is determined that it is necessary to change the cell ID.

According to the third aspect of the present invention in order to achieve the above-mentioned object, there is provided a relay station relaying wireless signals between a base station and a mobile station, the relay station including: a communication unit configured to transmit the wireless signals to the mobile station; and a control unit configured to cause a synchronization signal in which a synchronization sequence corresponding to a first cell ID and a synchronization sequence corresponding to a second cell ID are multiplexed to be transmitted from the communication unit to the mobile station belonging to the relay station and to also instruct the mobile station to carry out handover from the first cell ID to the second cell ID.

According to the fourth aspect of the present invention in order to achieve the above-mentioned object, there is provided a communication control method using a relay station relaying wireless signals between a base station and a mobile station, the communication control method including: transmitting a synchronization signal in which a synchronization sequence corresponding to a first cell ID and a synchronization sequence corresponding to a second cell ID are multiplexed to the mobile station belonging to the relay station from the relay station; and causing the relay station to instruct the mobile station to carry out handover from the first cell ID to the second cell ID.

Advantageous Effects of Invention

According to the relay station and the communication control method of the present invention, it is possible to avoid the collision of cell IDs while suppressing the throughput from being decreased in a relay communication of the movable relay station.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

"Embodiments for Carrying Out Invention" will be described in the following order.

1. Outline of wireless communication system
1-1. Example configuration of system
1-2. Configuration of communication resources
1-3. General handover procedure
1-4. Problem associated with present invention
2. Description of first embodiment
2-1. Example configuration of device
2-2. Process flow
2-3. Summary of first embodiment
3. Description of second embodiment
3-1. Example configuration of device
3-2. Process flow
3-3. Summary of second embodiment 1. Outline of Wireless Communication System First, an outline of a wireless communication system according to an embodiment of the present invention and problems associated with the present invention will be described with reference to FIGS. 1 to 5.

1-1. Example Configuration of System

Figure 1:
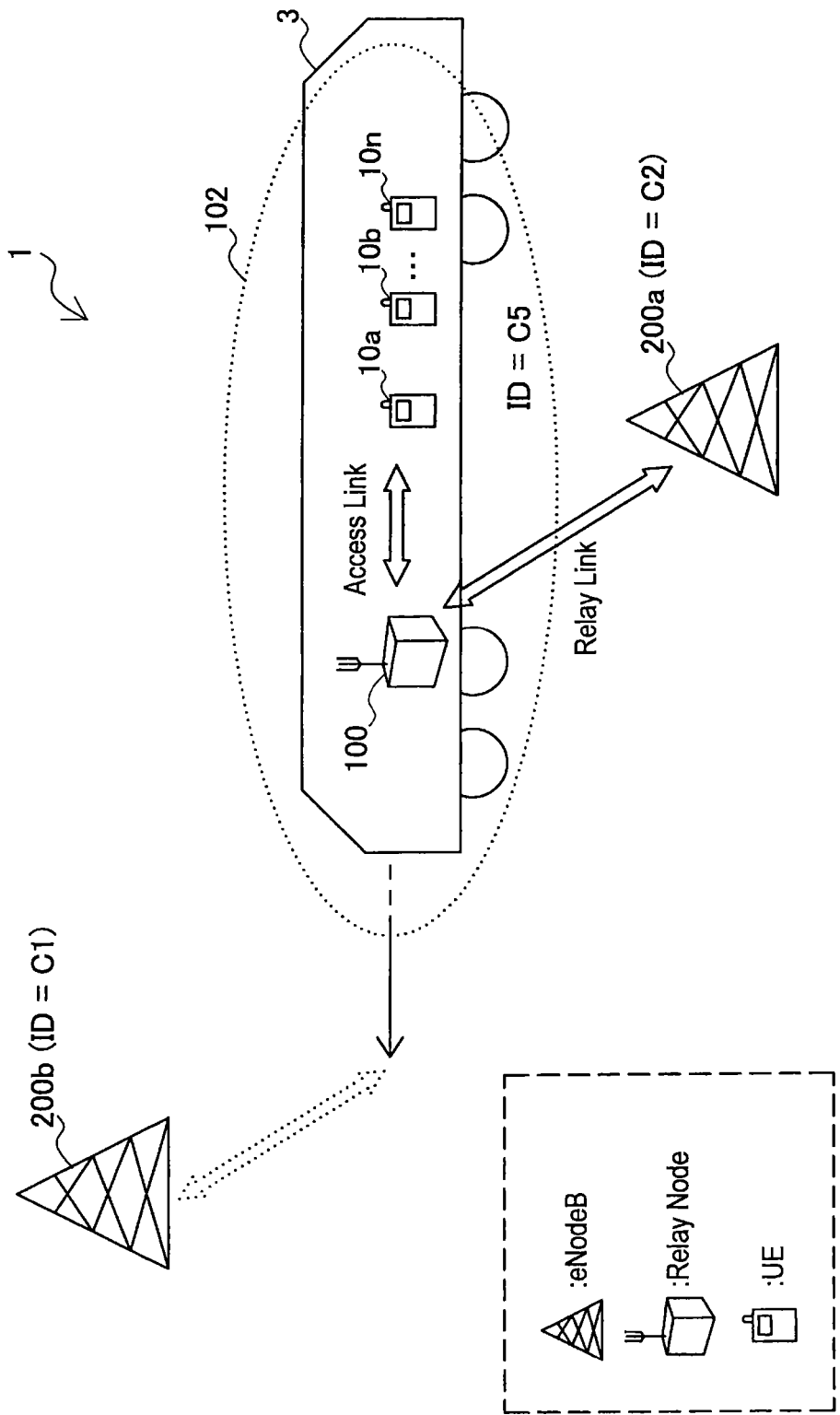
FIG. 1 is a diagram schematically illustrating an outline of a wireless communication system according to an embodiment.

FIG. 1 is a diagram schematically illustrating an outline of the wireless communication system 1 according to the embodiment of the present invention. Referring to FIG. 1, the wireless communication system 1 includes one or more mobile stations 10a, 10b, . . . , 10n, a relay station 100, and a plurality of base stations 200a and 200b. In addition, in the specification, when it is not necessary to discriminate between the mobile stations 10a, 10b, . . . , 10n, they are collectively referred to as a mobile station 10 by omitting the letter at the end of the reference sign. Similarly, when it is not necessary to discriminate between the base stations 200a and 200b, they are collectively referred to as a base station 200.

The mobile station 10, for example, is a terminal device (User Equipment (UE)) held by a passenger or a crew member using the moving means 3 such as a train or a ship. The mobile station 10 carries out the wireless communication with the relay station 100 or the base station 200 in accordance with the cellular wireless communication mode such as LTE or LTE-A.

The relay station 100 is a device that relays wireless signals between the mobile station 10 and the base station 200. In the example illustrated in FIG. 1, the relay station 100 is disposed within the moving means 3. When the moving means 3 is positioned near the base station 200a, the relay station 100 is connected to the base station 200a. In this case, the relay station 100, for example, relays the signal transmitted from the mobile station 10 to the base station 200a. In addition, the relay station 100, for example, relays the signal transmitted from the base station 200a to the mobile station 10. In the present embodiment, the relay station 100 is the relay station of type 1 described above. That is, a unique cell ID is allocated to the relay station 100. In the example illustrated in FIG. 1, the cell ID of the relay station 100 is "C5." The mobile station 10 located within the cell 102 in which the relay communication service is provided by the relay station 100 can thus be synchronized with the relay station 100 by virtue of the synchronization sequence corresponding to the cell ID of "C5" to benefit from the relay communication service of the relay station 100. In addition, a link between the mobile station 10 and the relay station 100 is an access link (Access Link). On the other hand, a link between the relay station 100 and the base station 200 is the relay link (Relay Link).

The base station 200 provides the mobile station 10 with the wireless communication service in accordance with the cellular wireless communication mode such as LTE or LTE-A. Each base station 200 has its own cell, and the cell ID is allocated to each cell. In the example illustrated in FIG. 1, the cell ID of the base station 200a is "C2," and the cell ID of the base station 200b is "C1." In addition, the base station of LTE or LTE-A is referred to as an Evolved Node B (eNodeB) or an eNB.

1-2. Configuration of Communication Resources

Figure 2:
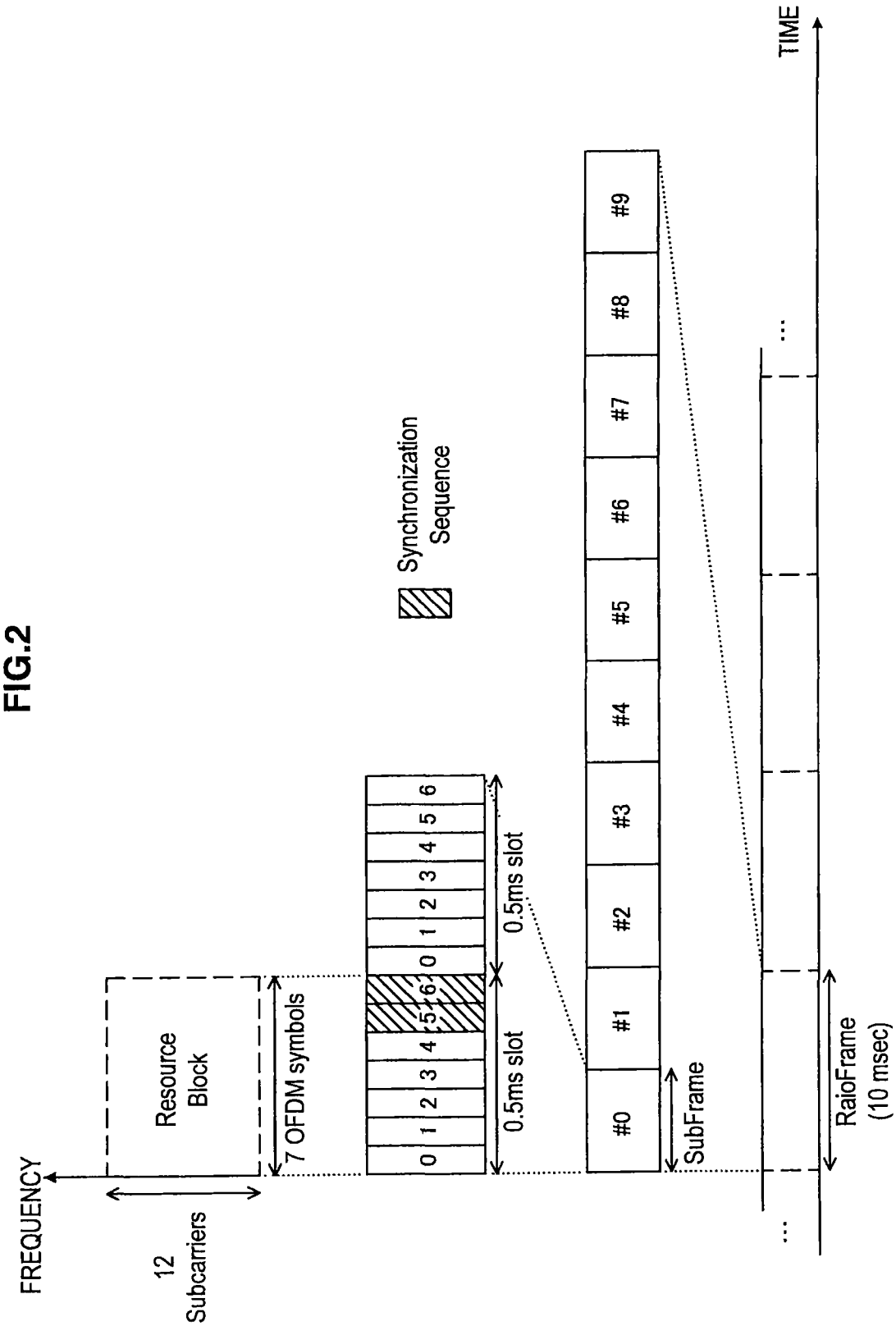
FIG. 2 is a diagram illustrating an example configuration of communication resources.

FIG. 2 illustrates a configuration of the communication resources of LTE as an example of the configuration of the communication resources for the relay communication. Referring to FIG. 2, the communication resources of LTE are divided into individual radio frames each having a length of 10 msec in a time direction. In addition, each of the radio frames includes 10 subframes, and one subframe consists of two 0.5-ms slots. In addition, one 0.5-ms slot typically includes seven OFDM symbols in the time direction. One unit of the communication resources including the seven OFDM symbols in the time direction and twelve subcarriers in the frequency direction is referred to as a resource block. In LTE, the communication resources are allocated to each mobile station for each subframe or resource block in the time direction. In addition, one unit of the communication resources corresponding to one OFDM symbol in the time direction and one subcarrier in the frequency direction is referred to as a resource element. That is, one resource block corresponds to 84 (=7×12) resource elements. The throughput of the data communication is increased insomuch as more resource blocks are allocated for the data communication with the same band width and the same duration.

In addition, the synchronization sequence is inserted each 5 ms into the resource block located at a predetermined position (typically, a center of the band) in the frequency direction (for example, the synchronization sequence is inserted into the subframes #0 and #5). As the synchronization sequence, there are two kinds of a primary synchronization sequence (PSS) and a secondary synchronization sequence (SSS). The primary synchronization sequence is used to detect the period of 5 ms and to identify the group of the cell ID. On the other hand, the secondary synchronization sequence is used to identify the cell ID within the identified group. For example, when the group of the cell IDs has three kinds and the cell ID for each group has 168 kinds, a total of 504 kinds (504=3× 168) of cell IDs may be used. Typically, as the signal series of the synchronization sequence for identifying the cell IDs, the Zadoff-Chu sequence is used. In addition, the OFDM symbol subsequent to the synchronization sequence may be used as a broadcast channel for transmitting or receiving system information. System-specific or cell-specific information is included in the system information on the broadcast channel.

Figure 3:
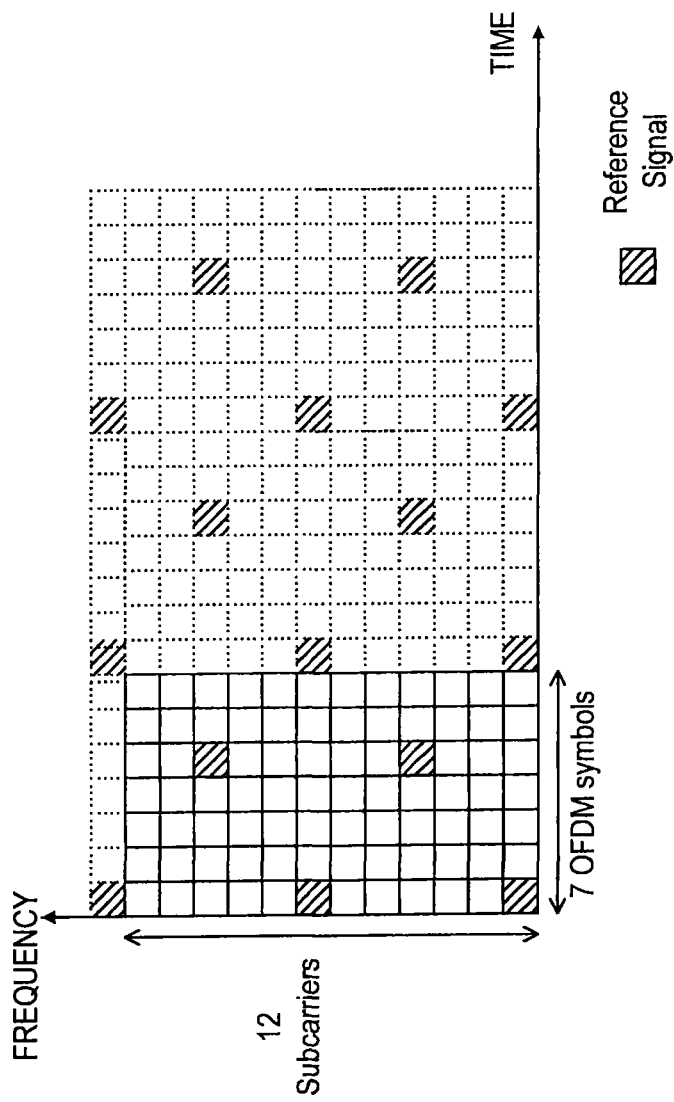
FIG. 3 is a diagram illustrating an example arrangement of reference signals.

FIG. 3 is a diagram illustrating an example arrangement of reference signals. The reference signal is a signal used to estimate the channel. In the example illustrated in FIG. 3, the reference signals are arranged in the first and seventh subcarriers of the first OFDM symbol and the fourth and tenth subcarriers of the fifth OFDM symbol for each resource block. The mobile station 10 may carry out the channel estimation by receiving the reference signals and demodulate the received signal for each subcarrier based on the estimated result. Here, the number of the pattern of arranging the reference signals is equal to the number of kinds of cell IDs (e.g., 504 patterns). Different reference signals are arranged in the adjacent cells having different cell IDs, and the data is thus prevented from being interfered.

In addition, when the quality of the communication channel measured by receiving the reference signal satisfies a predetermined condition, a handover is carried out. The predetermined condition, for example, is that the quality of the communication channel of an adjacent cell be better than the quality of the communication channel of the cell (also referred to as a serving cell) being connected, and so forth. In particular, in the relay communication of type 1, the handover may be carried out not only on the mobile station but also on the relay station or the base station.

1-3. General Handover Procedure

Figure 4:
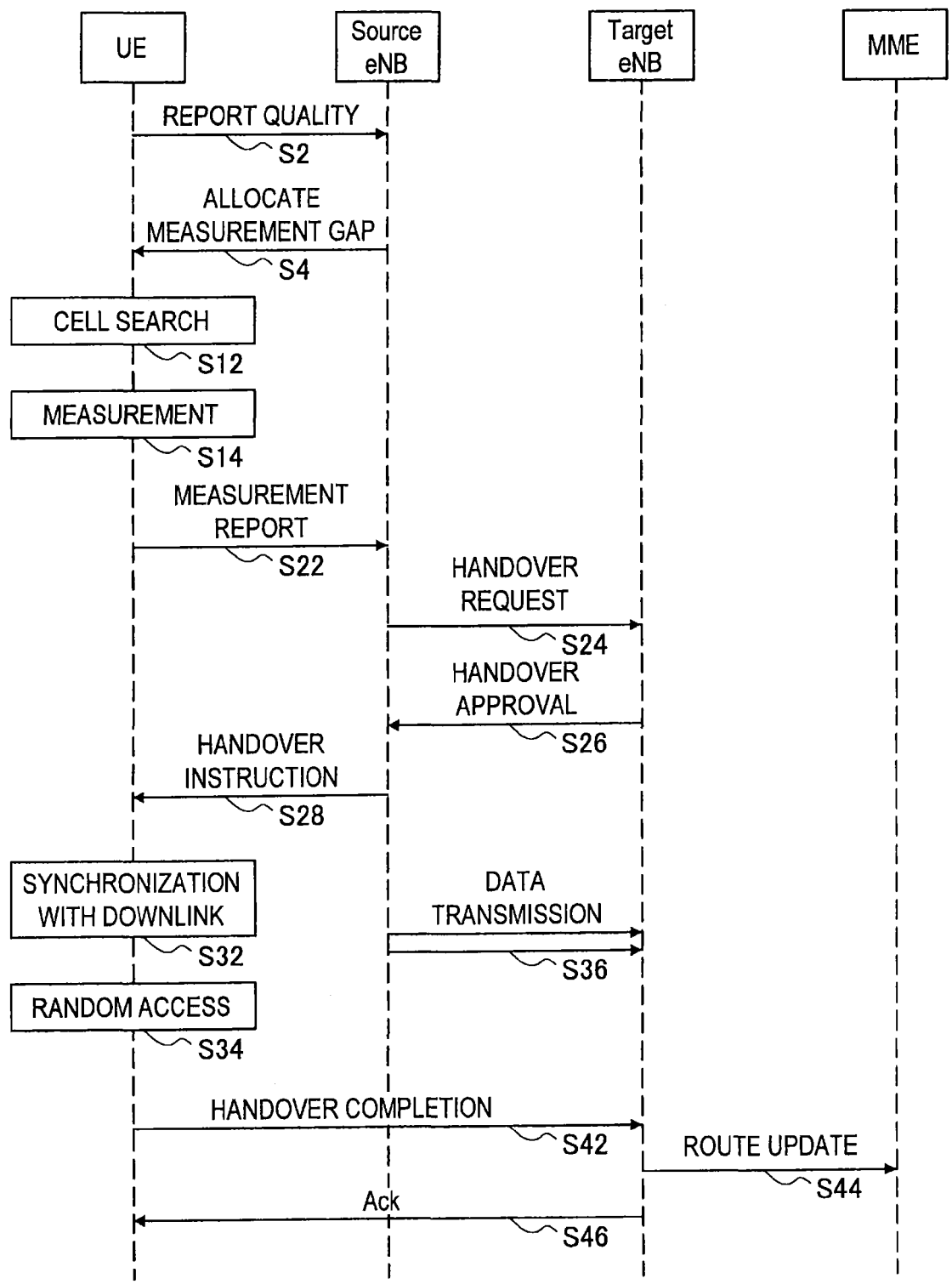
FIG. 4 is a sequence diagram illustrating a flow of a general handover procedure.

FIG. 4 illustrates a flow of the handover procedure without the relay communication as an example of the general handover procedure. Here, the mobile station (UE), the source base station (Source eNB), the target base station (Target eNB), and a mobility management entity (MME) are involved in the handover procedure.

In a phase previous to the handover, the mobile station first reports the channel quality of the communication channel between the mobile station and the source base station to the source base station (step S2). Reporting the channel quality may be periodically carried out, or may be carried out after the channel quality falls below a predetermined reference value.

Next, the source base station determines whether or not measurement is necessary based on the quality report received from the mobile station, and allocates the measurement gap to the mobile station when the measurement is necessary (step S4). The mobile station then searches a downlink channel (i.e., carries out the cell searching) from an adjacent base station in a period of the allocated measurement gap (step S12). In addition, the mobile station may know the nearby base stations to be searched in accordance with the list provided from the source base station beforehand.

Next, when the mobile station is synchronized with the downlink channel, the mobile station carries out the measurement using the reference signal included in the corresponding downlink channel (step S14). Meanwhile, the source base station limits allocation of the data communication associated with the corresponding mobile station so as to prevent the data from being transmitted by the corresponding mobile station.

The mobile station that has finished the measurement transmits the measurement report including the measurement result to the source base station (step S22). The measurement result included in the measurement report may be an average value or a representative value of the measurement values obtained through the plurality of measurements. In addition, data in a plurality of frequency bands may be included in the measurement result.

The source base station that has received the measurement report determines whether or not it is necessary to carry out the handover based on the contents of the measurement report. For example, when the channel quality of the other nearby base station is better than the channel quality of the source base station by a predetermined threshold value or higher, it may be determined that the handover is necessary. In this case, the source base station determines carrying out the handover procedure using the other base station as the target base station, and transmits the handover request message (Handover Request) to the target base station (step S24).

The target base station that has received the handover request message determines whether or not it is possible to accept the mobile station in response to the availability of the communication service provided by the target base station itself. When it is possible to accept the mobile station, the target base station transmits the handover approval message (Handover Request Confirm) to the source base station (step S26).

The source base station that has received the handover approval message transmits the handover instruction (Handover Command) to the mobile station (step S28). The mobile station is then synchronized with the downlink channel of the target base station (step S32). Next, the mobile station carries out the random access on the target base station using the random access channel disposed in a predetermined time slot (step S34). Meanwhile, the source base station transmits the data that has reached the mobile station to the target base station (step S36). The mobile station then transmits the handover completion message (Handover Complete) to the target base station when the random access is successful (step S42).

The target base station that has received the handover completion message requests that the MME update the route with regard to the mobile station (step S44). By causing the MME to update the route of the user data, it is possible for the mobile station to communicate with other devices via the new base station (i.e. target base station). The target base station then transmits the confirmation response (Acknowledgement) to the mobile station (step S46). This causes the series of handover procedures to be finished.

1-4. Problem Associated with Present Invention

As is understood from the description mentioned above, the handover procedure consumes a large amount of resources of the mobile station, the source base station, and the target base station. For this reason, when the handover occurs frequently, a risk that the entire throughput of the wireless communication system is decreased occurs. The risk is further increased in the situation using the movable relay station 100 in the wireless communication system 1 shown in FIG. 1.

Figure 5:
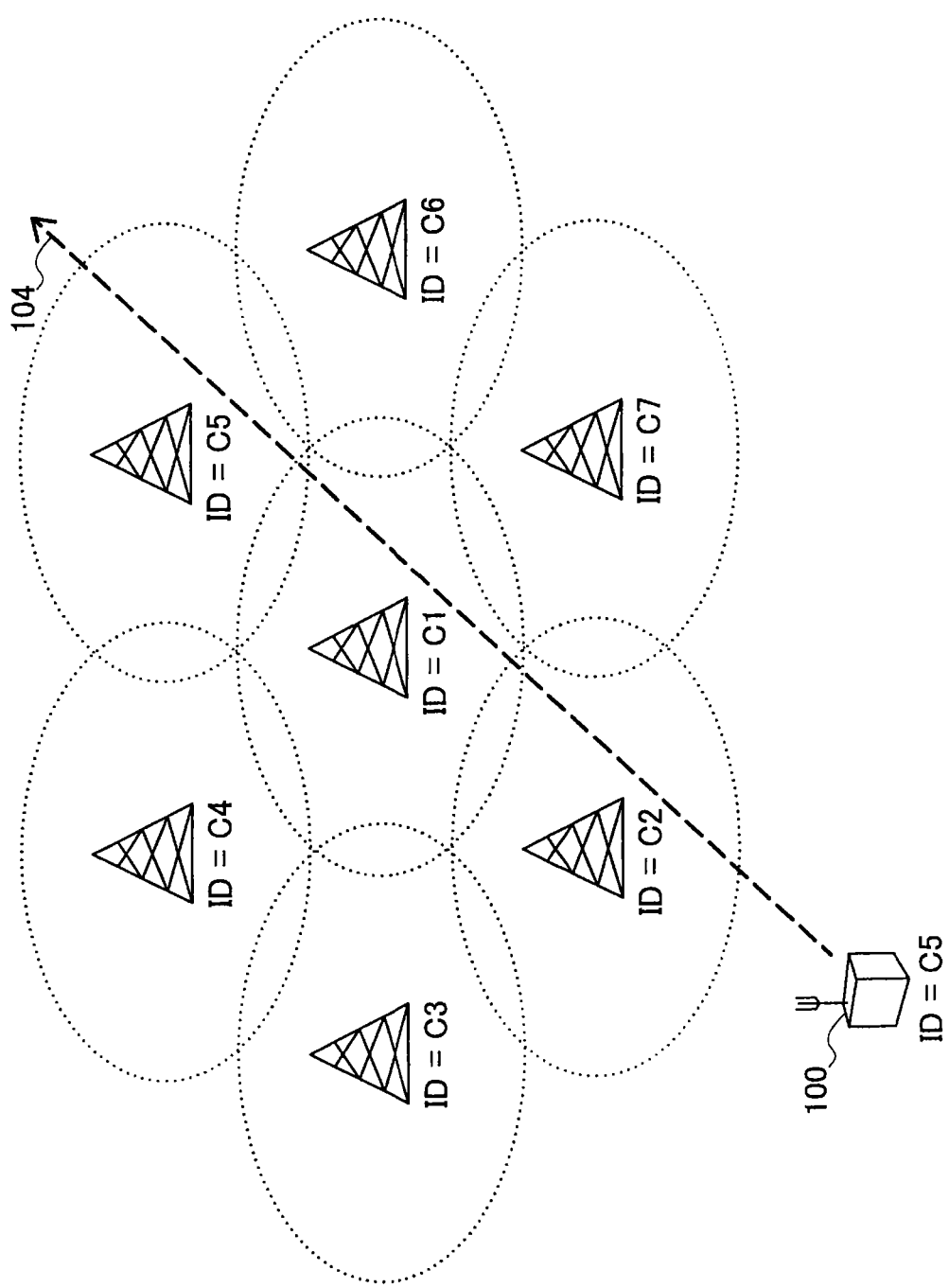
FIG. 5 is a diagram illustrating a problem associated with the present invention.

FIG. 5 is a diagram illustrating a problem associated with the present invention. Referring to FIG. 5, each of seven cells having the cell IDs of C1 to C7 is shown in an ellipse with the base station at the center thereof. In the arrangement mentioned above, for example, the relay station 100 moves along the route 104. In this case, the relay station 100 sequentially passes through the cells having the cell IDs of C2 (hereinafter referred to as a cell C2 or the like), C1, and C5.

Here, when the relay station 100 is the relay station of type 2, since the cell ID is not allocated to the relay station 100, the collision of the cell IDs does not occur. However, in this case, the mobile stations moving along with the relay station 100 should be collectively subjected to the handover at cell edges. The collective handover of the many mobile stations negatively affects the throughput of the entire system, which is thus not preferable.

On the other hand, when the relay station 100 is the relay station of type 1, the cell ID is allocated to the relay station 100. The mobile stations moving along with the relay station 100 are thus directly connected to the relay station 100. Here, in the example illustrated in FIG. 5, when the cell ID of the relay station 100 is C5, the collision of the cell ID occurs when the relay station 100 reaches inside the cell C5 or reaches the vicinity of the cell C5. As a result, interference occurs in the data communication of the mobile station connected to the relay station 100 and other mobile stations within the cell C5. As in the following two embodiments of the present invention that will be described in detail, it is beneficial to introduce the structure that suppresses the throughput of the entire system from being decreased while avoiding the collision of the cell IDs before it happens.

2. Description of First Embodiment 2-1. Example Configuration of Device (Mobile Station)

Figure 6:
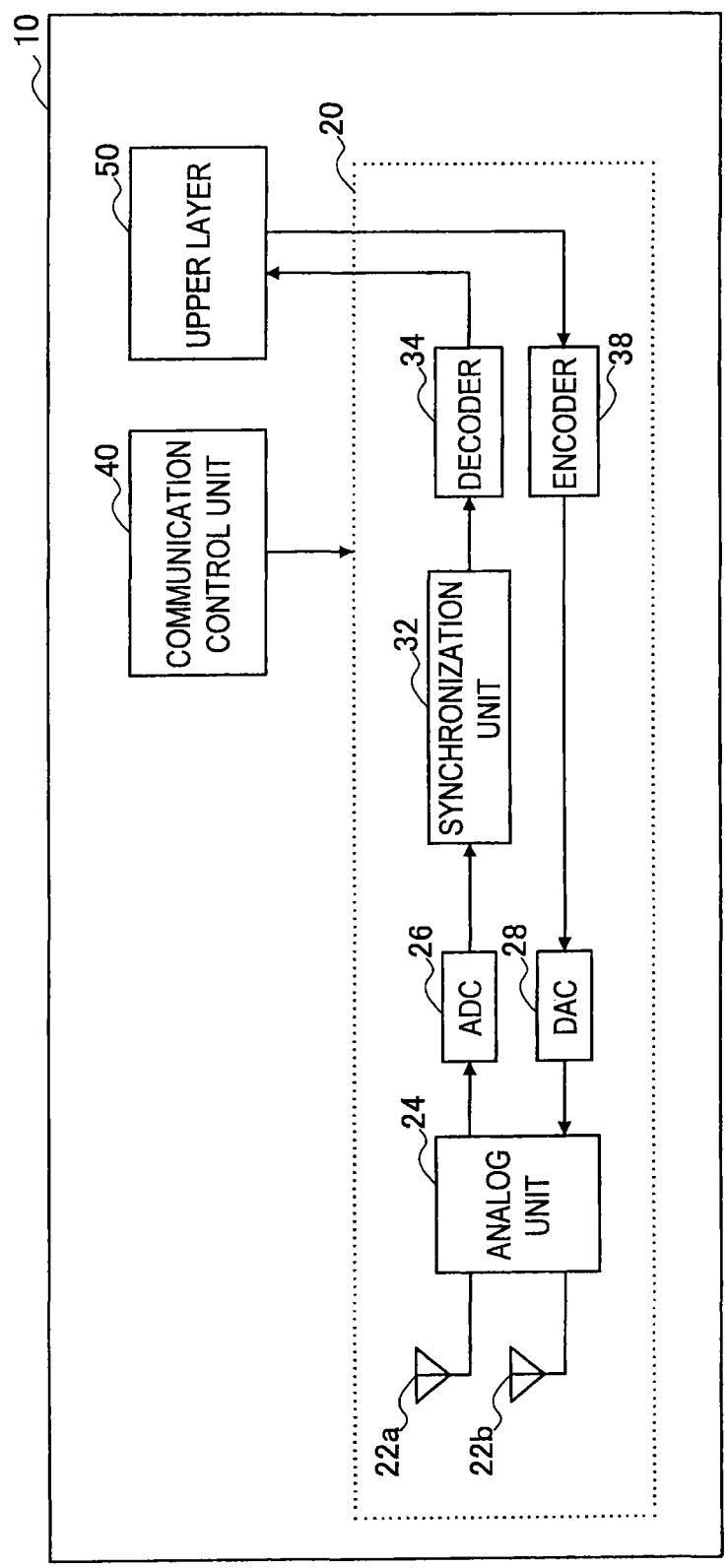
FIG. 6 is a block diagram illustrating an example configuration of a mobile station according to a first embodiment.

FIG. 6 is a block diagram illustrating an example configuration of the mobile station 10 according to the first embodiment of the present invention. Referring to FIG. 6, the mobile station 10 includes a communication unit 20, a communication control unit 40, and an upper layer 50.

The communication unit 20 is a communication interface for the mobile station 10 to transmit and receive the wireless signals with respect to the relay station 100 or the base station 200. The communication unit 20 includes antennas 22a and 22b, an analog unit 24, an analogue to digital converter (ADC) 26, a digital to analogue converter (DAC) 28, a synchronization unit 32, a decoder 34, and an encoder 38.

The analog unit 24, which corresponds to a radio frequency (RF) circuit, amplifies and frequency-converts the reception signals received via the antennas 22a and 22b and outputs them to the ADC 26. The ADC 26 converts the format of the reception signals input from the analog unit 24 from an analog format to a digital format. The synchronization unit 32 detects the primary synchronization sequence and the secondary synchronization sequence by monitoring the correlation between the reception signals input from the ADC 26 and the known signal sequences using, for example, a matched filter, and is synchronized with the desired cell ID. The decoder 34 demodulates and decodes the data signal included in the channel synchronized by the synchronization unit 32. The data signal decoded by the decoder 34 is output to the upper layer 50.

In addition, when the data signal is input from the upper layer 50, the encoder 38 codes and modulates the corresponding data signal. The data signal modulated by the encoder 38 is output to the DAC 28 as the transmission signal. The DAC 28 converts the format of the transmission signal input from the encoder 38 from a digital format to an analog format. The analog unit 24 then amplifies and frequency-converts the transmission signal input from the DAC 28, and then transmits the transmission signal via the antennas 22a and 22b.

The communication control unit 40 controls operations of the communication unit 20 mentioned above using a control device such as a central processing unit (CPU) or a digital signal processor (DSP) and a storage medium such as a semiconductor memory. For example, when the handover instruction is received from the relay station 100 or the base station 200, the communication control unit 40 causes the synchronization unit 32 of the communication unit 20 to be synchronized with the new cell ID. When the handover to the new cell ID is successful, the communication control unit 40 causes the handover completion message to be transmitted from the communication unit 20. In addition, the communication control unit 40 controls the communication timing of the communication unit 20 with respect to other devices in accordance with the scheduling information distributed on the control channel of the downlink.

The upper layer 50, for example, carries out the process of the layer higher than the MAC layer of the protocol stack. For example, when the mobile station 10 is a smart phone, the upper layer 50 provides the user with an application service such as an audio call service or a data communication service using the wireless communication via the communication unit 20.

(Relay Station)

Figure 7:
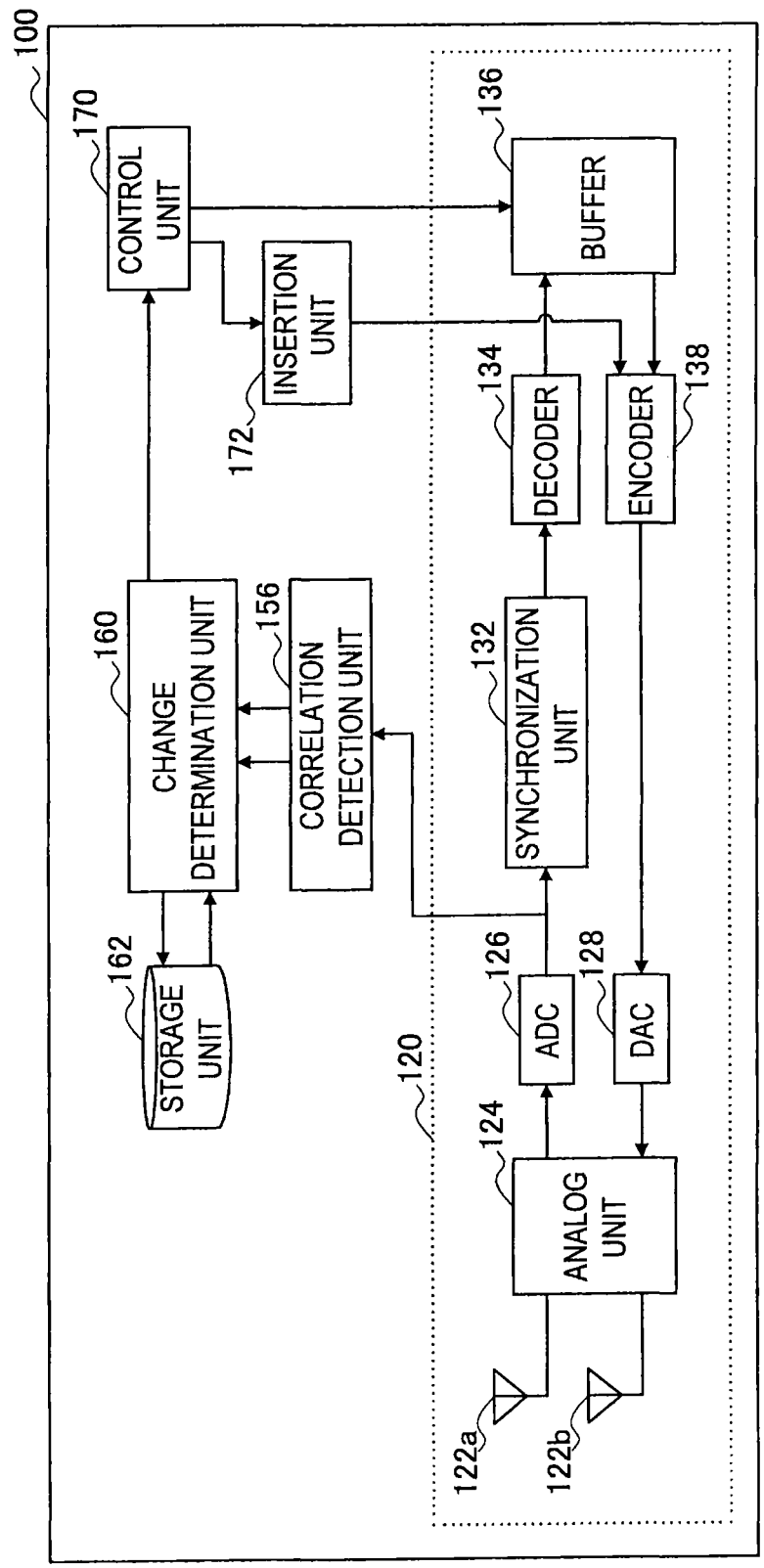
FIG. 7 is a block diagram illustrating an example configuration of a relay station according to the first embodiment.

FIG. 7 is a block diagram illustrating an example configuration of the relay station 100 according to the first embodiment of the present invention. Referring to FIG. 7, the relay station 100 includes a communication unit 120, a correlation detection unit 156, a change determination unit 160, a storage unit 162, a control unit 170, and an insertion unit 172.

The communication unit 120 relays the wireless signal transmitted and received between the mobile station 10 and the base station 200. In addition, the communication unit 120 is also used to distribute various signals for providing the relay communication service of the relay station 100 such as the synchronization signals (the primary synchronization sequence and the second synchronization sequence) of the cell ID allocated to the relay station 100. The communication unit 120 includes antennas 122a and 122b, an analog unit 124, an ADC 126, a DAC 128, a synchronization unit 132, a decoder 134, a buffer 136, and an encoder 138.

The analog unit 124, which corresponds to an RF circuit, amplifies and frequency-converts the reception signals received via the antennas 122a and 122b and then outputs them to the ADC 126. The ADC 126 converts the format of the reception signal input from the analog unit 124 from an analog format to a digital format. The synchronization unit 132 detects the primary synchronization sequence and the secondary synchronization sequence by monitoring the correlation between the reception signals input from the ADC 126 and the known signal sequences using, for example, a matched filter, and is synchronized with the desired cell ID. In the relay communication, the synchronization unit 32 of the mobile station 10 is synchronized with the cell ID of the relay station 100, while the synchronization unit 132 of the relay station 100 is synchronized with the cell ID of the nearby base station 200. The decoder 134 demodulates and decodes the data signal included in the reception signal. The data signal demodulated by the decoder 34 is output to the buffer 136.

The encoder 138 codes and modulates the data signal buffered in the buffer 136. The data signal modulated by the encoder 138 is output to the DAC 128 as the transmission signal. The DAC 128 converts the format of the transmission signal input from the encoder 138 from a digital format to an analog format. The analog unit 124 then amplifies and frequency-converts the transmission signals input from the DAC 128, and outputs them via the antennas 122a and 122b.

The correlation detection unit 156 detects the correlation between the synchronization sequences and one or more cell IDs in the wireless signals received by the communication unit 120. The correlation detection unit 156 then outputs the correlation value for each cell ID to the change determination unit 160. In addition, it is preferable that the correlation detection unit 156 have a plurality of correlators (e.g., matched filters) to enable correlations of the plurality of cell IDs to be detected in parallel as will be described later.

The change determination unit 160 determines whether or not it is necessary to change the cell ID of the relay station 100 in order to avoid the collision between the cell ID of the relay station 100 and the cell ID of the base station 200 due to the movement of the relay station 100. In particular, in the present embodiment, the change determination unit 160 determines whether or not it is necessary to change the cell ID by monitoring the correlations of one or more cell IDs input from the correlation detection unit 156. In addition, the one or more cell IDs are not necessarily the total 504 kinds of the cell IDs. For example, it is possible to reduce the process cost that is necessary for the monitoring by limiting targets to be monitored on the cell IDs of one or more adjacent cells and the serving cell included in the system information distributed on the broadcast channel from the base station 200.

Figure 8:
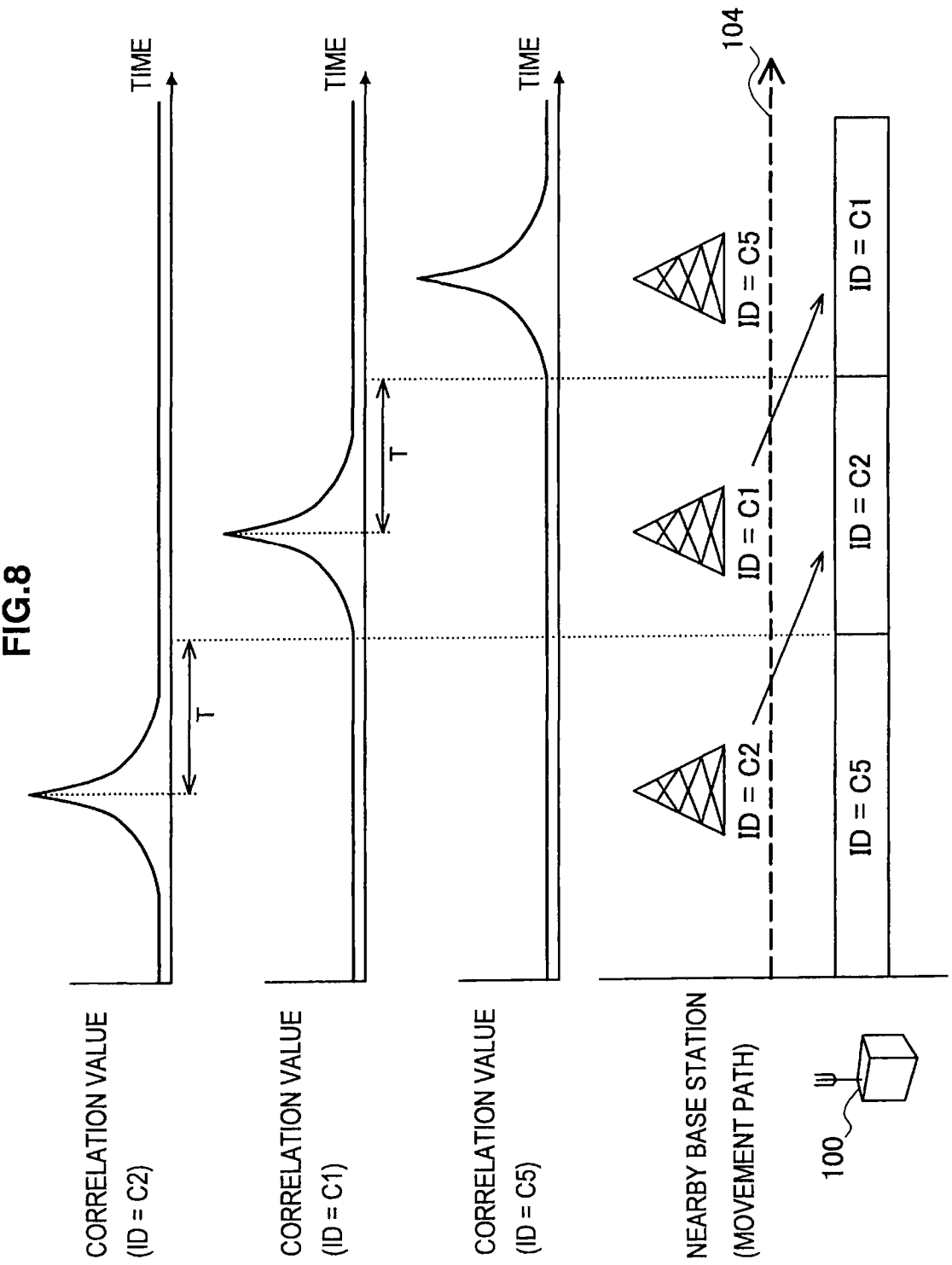
FIG. 8 is a diagram illustrating a cell ID change determination process according to the first embodiment.

FIG. 8 is a diagram illustrating a cell ID change determination process of the change determination unit 160 of the present embodiment. Referring to FIG. 8, as an example, the relay station 100 moves along the movement path 104 to sequentially pass through the cells C2, C1, and C5. In this case, first, the correlation value of the cell ID of C2 output from the correlation detection unit 156 of the relay station 100 reaches the maximum near the base station 200 of the cell C2. Next, the correlation value of the cell ID of C1 reaches the maximum near the base station 200 of the cell C1. Next, the correlation value of the cell ID of C5 reaches the maximum near the base station 200 of the cell C5.

On the movement path described above, the change determination unit 160 determines that it is necessary to change the first cell ID that is a cell ID being used to the second cell ID having the maximum correlation value after a predetermined time has elapsed from the point of time at which the correlation value of the synchronization sequence of any of the cell IDs reaches the maximum. In the example illustrated in FIG. 8, the cell ID of the relay station 100 is changed from C5 to C2 at a timing at which a time T has elapsed from the point of time at which the correlation value of the cell ID of C2 reaches the maximum. In addition, the cell ID of the relay station 100 is changed from C2 to C1 at a timing at which a time T has elapsed from the point of time at which the correlation value of the cell ID of C1 reaches the maximum.

In general, the cell IDs of adjacent fixed cells are allocated beforehand without duplication in the cellular wireless communication mode. Therefore, as described with reference to FIG. 8, by sequentially using the cell IDs of the cells through which the relay station 100 passes, it is possible to avoid the collision between the cell ID of the relay station 100 and the cell ID of the nearby base station 200.

The storage unit 162 uses a storage medium such as a hard disk or a semiconductor memory to store the correlation value for each cell ID output from the correlation detection unit 156 to the change determination unit 160 along the time axis. The change determination unit 160 recognizes the point of time at which the correlation value of each cell ID reaches the maximum based on such changes in correlation value.

The control unit 170 controls relaying of the wireless signals of the communication unit 120 using the control device such as a CPU or a DSP and the storage medium such as a semiconductor memory. For example, the control unit 170 causes the data signals received from the base station 200 to be temporarily accumulated in the buffer 136 of the communication unit 120, and then causes the corresponding data signals to be transmitted from the communication unit 120 to the mobile station 10. In addition, the control unit 170 causes the data signals received from the mobile station 10 to be temporarily accumulated in the buffer 136 of the communication unit 120, and then causes the corresponding data signals to be transmitted from the communication unit 120 to the base station 200.

In addition, when the change determination unit 160 determines that it is necessary to change the cell ID of the relay station 100, the control unit 170 causes the cell ID of an access point of the mobile station 10 belonging to the relay station 100 to be changed from the first cell ID to the second cell ID. In particular, the control unit 170 first causes the insertion unit 172 to generate a synchronization signal in which the synchronization sequence corresponding to the first cell ID and the synchronization sequence corresponding to the second cell ID are multiplexed. The control unit 170 then causes the insertion unit 172 to insert the corresponding synchronization signal from the communication unit 120 to a synchronization channel of a downlink to the mobile station 10. The control unit 170 then causes the handover instruction to indicate the handover from the first cell ID to the second cell ID to be transmitted from the communication unit 120 to the mobile station 10. This enables the mobile station 10 to change the cell ID of the access point from the first cell ID to the second cell ID in accordance with the pseudo-handover procedure. For example, when the handover completion messages are received from all mobile stations 10 belonging to the relay station 100, the control unit resumes relaying the wireless signals using the second cell ID. In addition, for example, when the handover completion messages are not received from some of the mobile stations 10, the control unit 170 may resume relaying the wireless signals using the second cell ID after a predetermined time-out period is elapsed.

The insertion unit 172 inserts the synchronization sequences corresponding to the cell ID of the relay station 100 (primary synchronization sequence and secondary synchronization sequence) from the relay station 100 to the synchronization channel of the downlink to the mobile station 10. In addition, after the cell ID is determined to be changed by the change determination unit 160, the insertion unit 172 inserts the synchronization signal in which synchronization sequences corresponding to two kinds of cell IDs are multiplexed during the period until the completion (or time-out) of the pseudo-handover of all mobile stations 10 from the relay station 100 to the synchronization channel of the downlink to the mobile station 10 under control of the control unit 170. The two kinds of cell IDs indicate the first cell ID and the second cell ID described above.

(Base Station)

Figure 9:
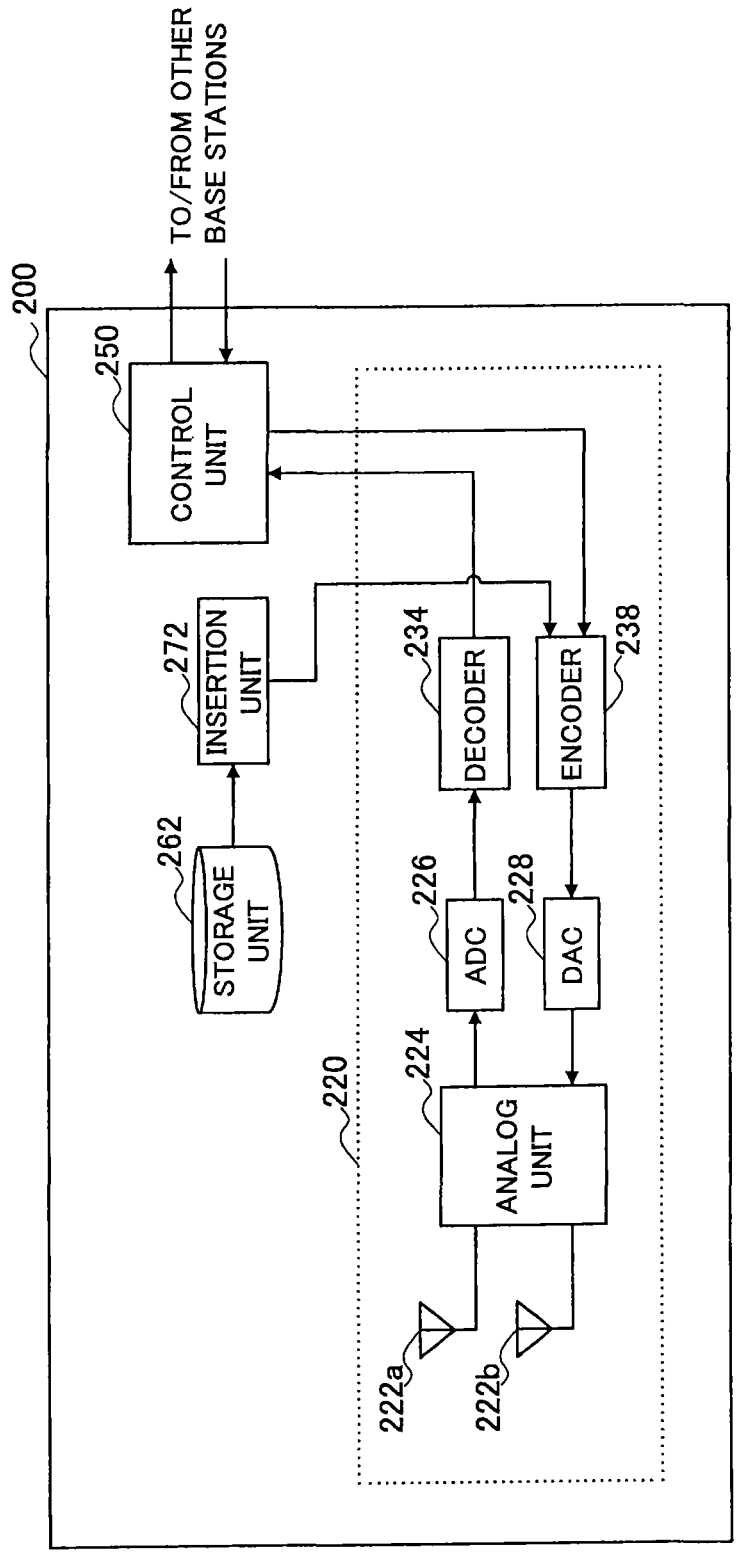
FIG. 9 is a block diagram illustrating an example configuration of a base station according to the first embodiment.

FIG. 9 is a block diagram illustrating an example configuration of the base station 200 according to the first embodiment of the present invention. Referring to FIG. 9, the base station 200 includes a communication unit 220, a control unit 250, a storage unit 262, and an insertion unit 272.

The communication unit 220 is a communication interface for the base station 200 to transmit and receive the wireless signals with respect to the relay station 100 or the mobile station 10. The communication unit 220 includes antennas 222a and 222b, an analog unit 224, an ADC 226, a DAC 228, a decoder 234, and an encoder 238.

The analog unit 224 corresponds to an RF circuit, amplifies and frequency-converts the reception signal received via the antennas 222a and 222b, and then outputs them to the ADC 226. The ADC 226 converts the format of the reception signal input from the analog unit 224 from an analog format to a digital format. The decoder 234 demodulates and decodes the data signal included in the reception signal AD-converted by the ADC 226. The data signal decoded by the decoder 234 is output to the control unit 250.

In addition, when the data signal is input from the control unit 250, the encoder 238 codes and modulates the corresponding data signal. The data signal modulated by the encoder 238 is output to the DAC 228 as a transmission signal. The DAC 228 converts the format of the transmission signal input from the encoder 38 from a digital format to an analog format. The analog unit 224 amplifies and frequency-converts the transmission signal input from the DAC 228, and then transmits the transmission signal via the antennas 222a and 222b.

The control unit 250 controls operations of the communication unit 220 described above using the control device such as the CPU or the DSP and the storage medium such as the semiconductor memory. For example, the control unit 250 distributes the scheduling information for the mobile station 10 or the relay station 100 on the control channel of the downlink. In addition, the control unit 250 transmits the data signal received from the mobile station 10 or the relay station 100 to another base station 200 in accordance with the route control of the MME. In addition, the control unit 250 controls the handover procedure of the base station 200 in a similar way to the base station in the handover procedure described with reference to FIG. 4.

The storage unit 262 stores the cell ID allocated to the base station 200 using the storage medium such as the hard disk or the semiconductor memory. The insertion unit 272 inserts the synchronization sequence corresponding to the cell ID of the base station 200 to the synchronization channel of the downlink from the base station 200.

2-2. Process Flow

Figure 10:
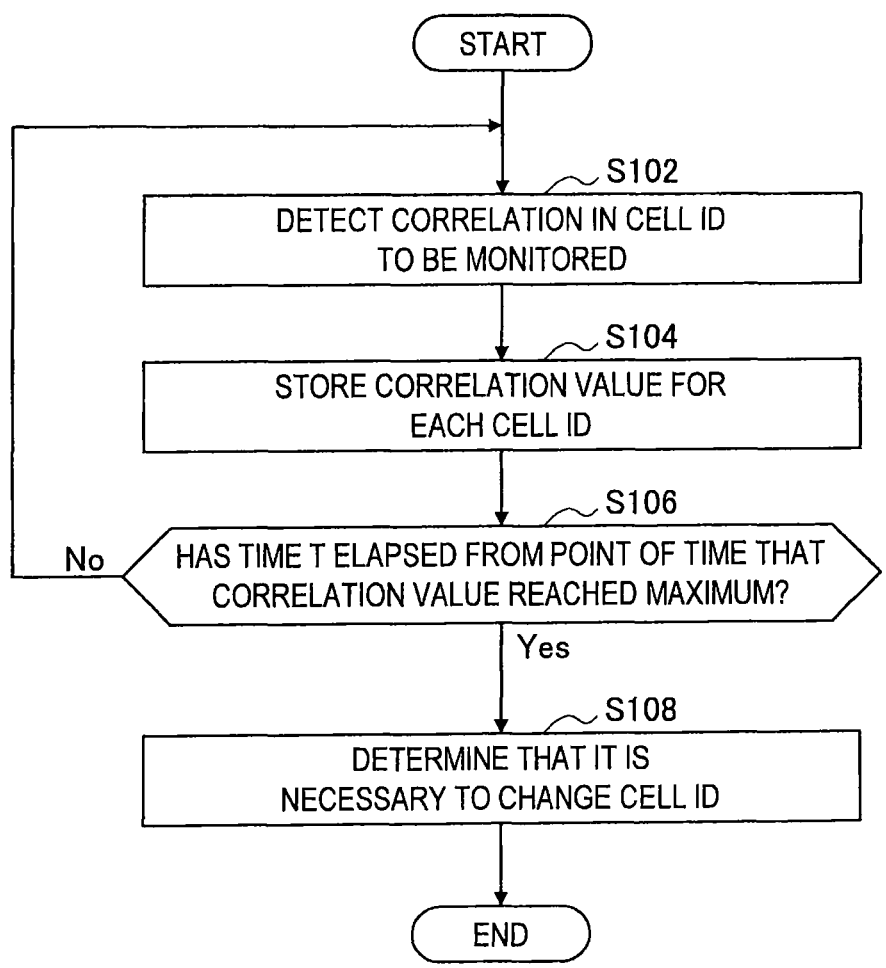
FIG. 10 is a flowchart illustrating an example flow of a cell ID change determination process according to the first embodiment.

Hereinafter, the flow of the communication control process at the time of relay communication according to the present embodiment will be described with reference to FIGS. 10 and 11. FIG. 10 is a flowchart illustrating an example flow of the cell ID change determination process included in the communication control process of the present embodiment.

First, referring to FIG. 10, the correlation of the cell ID of the target to be monitored is detected by the correlation detection unit 156 of the relay station 100 (step S102). The cell ID of the target to be monitored may be cell IDs of the serving cell and one or more adjacent cells. Next, the correlation value detected by the correlation detection unit 156 is stored for each cell ID along the time axis by the storage unit 162 (step S104). The change determination unit 160 of the relay station 100 monitors such a correlation value for each cell ID.

Next, the change determination unit 160 determines whether or not a time T has elapsed from the point of time at which the correlation value of any of the cell IDs reaches the maximum (step S106). Here, when the cell ID is not present after the time T has elapsed from the point of time at which the correlation value reaches the maximum, the process returns to step S102, and monitoring the correlation value for each cell ID is continued. In addition, when the correlation value is the maximum value and the maximum value is smaller than a predetermined threshold value, the change determination unit 160, for example, may ignore the timing at which the correlation value reaches the maximum. This can prevent the cell ID from being changed at an inappropriate timing due to the fine time variation of the correlation value.

In step S106, when the cell ID is present after the time T has elapsed from the point of time at which the correlation value reaches the maximum, the change determination unit 160 determines that it is necessary to change the cell ID of the relay station 100 (step S108).

Figure 11:
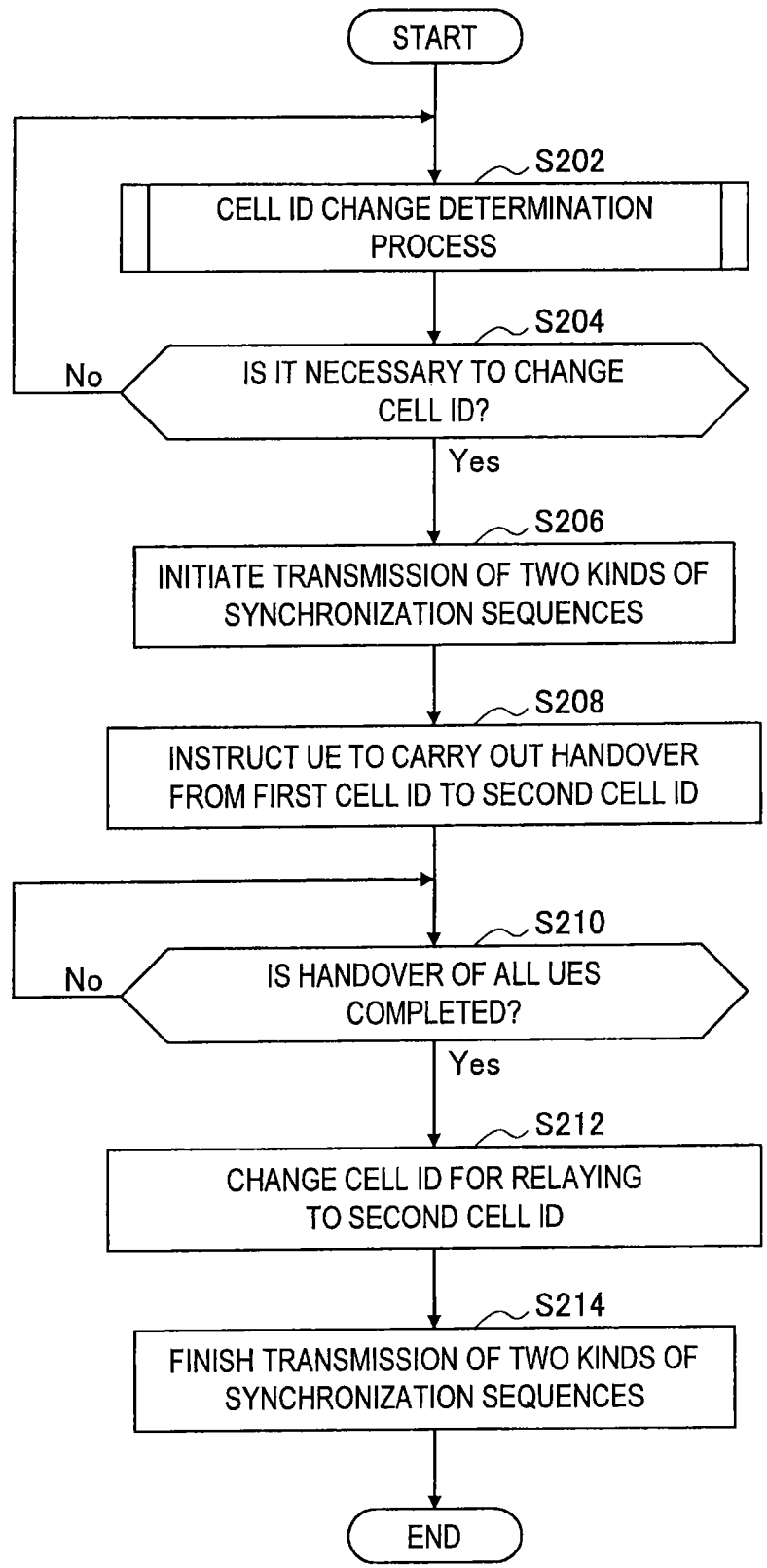
FIG. 11 is a flowchart illustrating an example flow of a communication control process according to the first embodiment.

FIG. 11 is a flowchart illustrating an example flow of the communication control process according to the present embodiment. First, referring to FIG. 11, the cell ID change determination process described with reference to FIG. 10 is carried out by the relay station 100 (step S202). Next, whether it is necessary to change the cell ID as the result of the cell ID change determination process is determined by the relay station 100 (step S204). Here, when it is not determined that it is necessary to change the cell ID, the subsequent process is not carried out.

When it is determined that it is necessary to change the cell ID as the result of the cell ID change determination process, transmission of the synchronization signal in which the two kinds of synchronization sequences are multiplexed is initiated by the communication unit 120 of the relay station 100 (step S206). As described above, the two kinds of synchronization sequences are the synchronization sequence corresponding to the first cell ID being used and the synchronization sequence corresponding to the second cell ID of which the correlation value reaches the maximum.

Next, the control unit 170 of the relay station 100 instructs the mobile stations 10 belonging to the relay station 100 to carry out the handover from the first cell ID to the second cell ID (step S208). Each of the mobile stations 10 then detects the synchronization signal from the relay station 100, and is synchronized with the second cell ID. In addition, the two kinds of synchronization sequences described above are multiplexed in the synchronization signal from the relay station 100. However, since the signal series of the synchronization sequences are in orthogonal relation with each other, the mobile station 10 may separate the two kinds of synchronization sequences to acquire the synchronization.

Here, the access point of the mobile station 10 is the relay station 100 over a period before and after the handover conducted by the mobile station 10 in the communication control process of FIG. 11. That is, the corresponding handover is merely a pseudo-handover for changing the cell ID. At the time of carrying out such a pseudo-handover, since the access point of the mobile station 10 is not changed, adjusting the timing of signal transmission from the mobile station 10 again may be omitted. Accordingly, in this case, the mobile station 10 may skip the random access in the handover procedure as shown in FIG. 4 (the relay station 100 corresponds to both of the source base station and the target base station in FIG. 4). In addition, the measurement to be carried out by the mobile station 10 is unnecessary.

Next, the control unit 170 of the relay station 100 awaits reception of the handover completion message from the mobile station 10 (step S210). When the handover completion messages from all of the mobile stations 10 are received (or when the time-out occurs), the control unit 170 changes the cell ID for relaying the wireless signals to the second cell ID (step S212). The communication unit 120 finishes transmission of the synchronization signal in which the two kinds of synchronization sequences are multiplexed (step S214).

2-3. Summary of First Embodiment

So far, the first embodiment of the present invention has been described with reference to FIGS. 6 to 11. According to the present embodiment, when it is determined that it is necessary to change the cell ID of the relay station 100 in order to avoid the collision of the cell IDs, the relay station 100 uses the pseudo-handover procedure to cause the cell ID of the access point of the mobile station 10 belonging to the relay station 100 to be changed from the first cell ID to the second cell ID. In this case, although the handover is carried out by each of the mobile stations 10 belonging to the relay station 100, the base station 200 outside the moving means 3 is not involved in the corresponding handover procedure. Therefore, at least the throughput of the communication service provided by the base station 200 outside the moving means 3 is thus not reduced. In addition, since the handover carried out by the mobile stations 10 belonging to the relay station 100 is the pseudo-handover without change in access point, it is possible to change to the fast cell ID by omitting some of the handover procedure (such as measurement and random access).

In addition, in the present embodiment, the relay station 100 determines whether or not it is necessary to change the cell ID by monitoring the correlation between the synchronization sequences and one or more cell IDs in the wireless signals received from the nearby base station 200. Accordingly, since the implementation does not impact a device other than the relay station 10, it can be realized at a relatively small cost in the present embodiment.

In addition, in the present embodiment, the change determination unit 160 of the relay station 100 determines that it is necessary to change the first cell ID that is the cell ID being used to the second cell ID that is cell ID of which the correlation value reaches the maximum after a predetermined time has elapsed from the point of time at which the correlation value in the synchronization sequence of any of the cell IDs reaches the maximum. This enables the collision between the cell ID of the relay station 100 and the cell ID of nearby the base station 200 to be avoided without predicting the position of the relay station 100.

3. Description of Second Embodiment

In the second embodiment of the present invention, a relay station 300 that will be described below is used instead of the relay station 100 shown in FIG. 1.

3-1. Example Configuration of Device (Relay Station)

Figure 12:
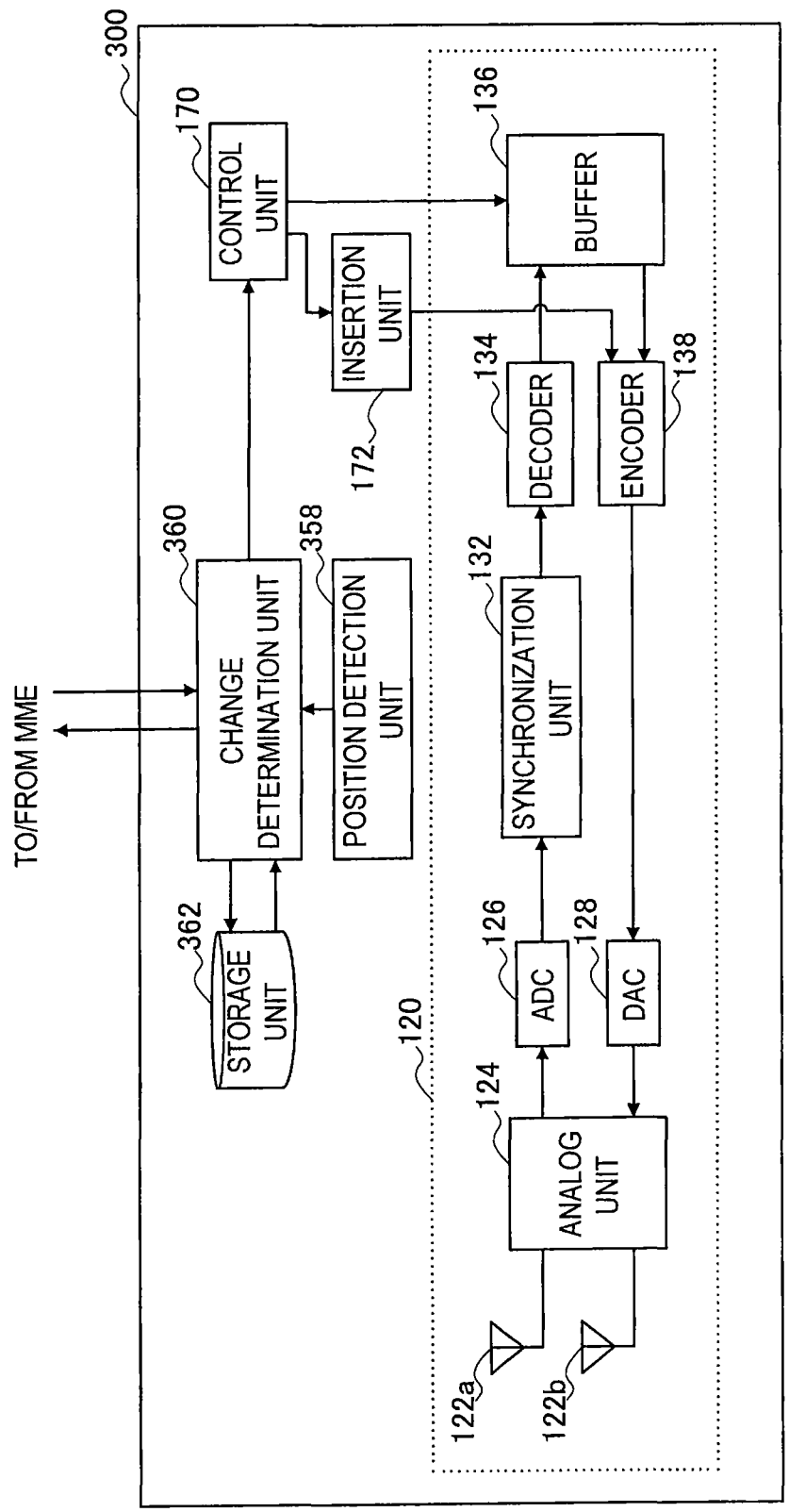
FIG. 12 is a block diagram illustrating an example of a relay station according to a second embodiment.

FIG. 12 is a block diagram illustrating an example configuration of the relay station 300 according to the second embodiment of the present invention. Referring to FIG. 12, the relay station 300 includes the communication unit 120, a position detection unit 358, a change determination unit 360, a storage unit 362, the control unit 170, and the insertion unit 172.

The position detection unit 358, for example, corresponds to position detection means such as a global positioning system (GPS) function or a train positioning function of a railroad system, and detects the position of the relay station 300.

In addition, the position detection unit 358 may simply detect the position of the relay station 300 by contrasting the cell ID data that will be described below with the current cell ID of the relay station 300. The position detection unit 358 then outputs the detected position of the relay station 300 to the change determination unit 360.

Figure 13:
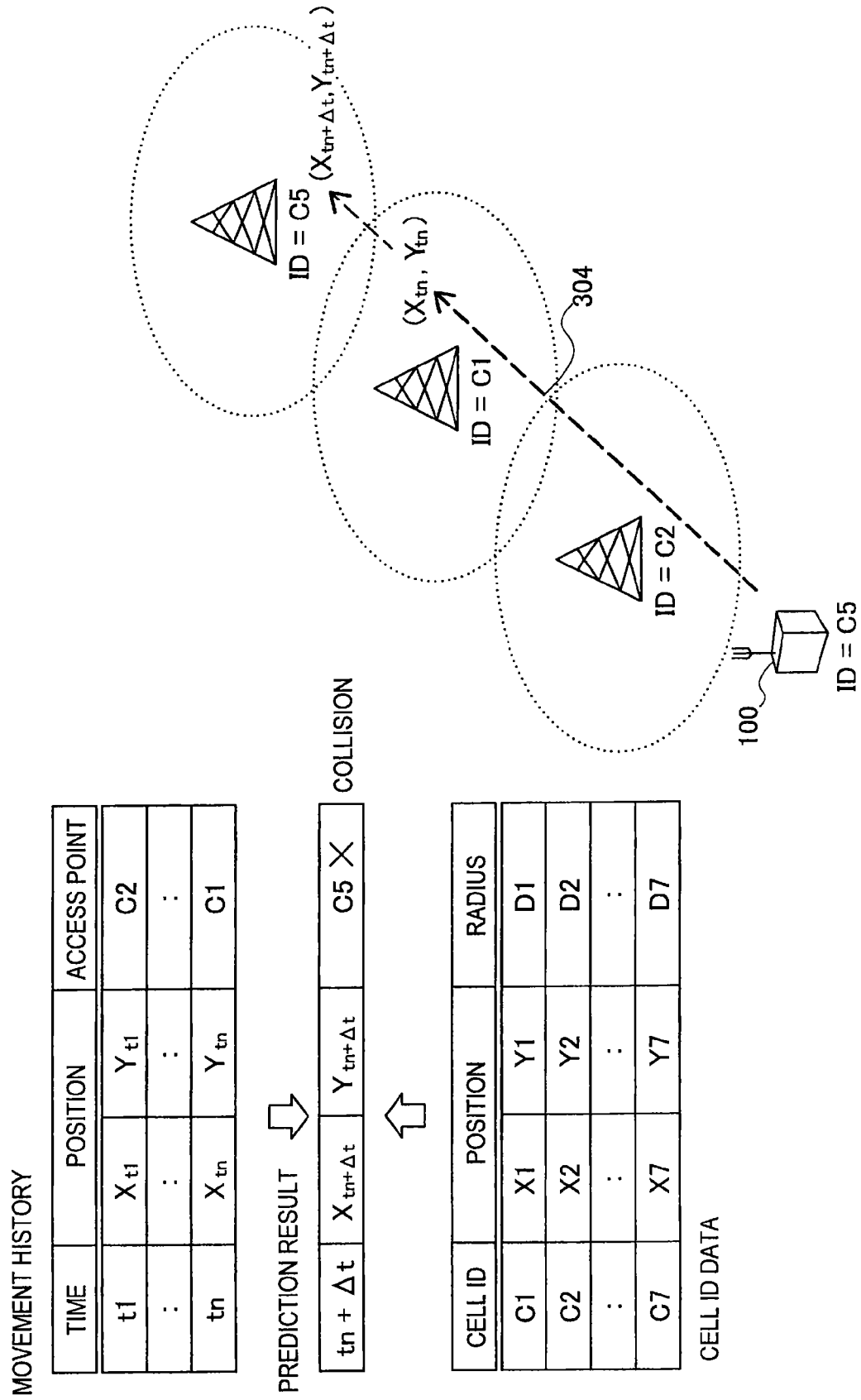
FIG. 13 is a diagram illustrating a cell ID change determination process according to the second embodiment.

The change determination unit 360 determines whether or not it is necessary to change the cell ID of the relay station 300 in order to avoid the collision between the cell ID of the relay station 300 and the cell ID of the base station 200 due to the movement of the relay station 300. In particular, in the present embodiment, the change determination unit 360 determines the possibility of the cell ID collision based on the movement history of the relay station 300 and the cell ID data as shown in FIG. 13. When it is determined that there is a possibility of the cell ID collision, the change determination unit 360 determines that it is necessary to change the cell ID.

FIG. 13 is a diagram illustrating the cell ID change determination process of the change determination unit 360 according to the present embodiment. The history of the position of the relay station 300 detected by the position detection unit 358 is illustrated as the movement history along the time axis to the upper left of FIG. 13. The movement history may be stored at a constant time interval, or alternatively, may be stored whenever the base station 200 of the access point of the relay station 300 is changed. In addition, the moving speed of the relay device 100 may be further included in the movement history. In the example of FIG. 13, the relay station 300 moves along the path 304, and is then positioned in a position $(X_{tn}, Y_{tn})$ and also positioned within the cell C1 at the time tn.

On the other hand, an example of the cell ID data is illustrated on the lower left of FIG. 13. In the present specification, the cell ID data is data associating the position of the base station 200 with the cell ID. The cell ID data, for example, is held and updated in an upper node such as the MME. The change determination unit 360 acquires such cell ID data and causes the data to be stored in the storage unit 362. In the example of FIG. 13, the cell ID data includes the position of the base station 200 and the cell radius in each of the seven cells C1 to C7. In addition, values of maximum transmission powers for determining the size of each cell may be included in the cell ID data instead of the cell radius.

The change determination unit 360 determines the possibility of the collision of the cell IDs at a future point of time (such as several seconds or several minutes later) based on the cell ID data and the movement history of the relay station 300. In the example of FIG. 13, for example, the position of the relay station 300 after a time Δt from a time tn is predicted to be $(X_{tn+\Delta t}, Y_{tn+\Delta t})$ by extrapolating the movement history. It can be known that the position $(X_{tn+\Delta t}, Y_{tn+\Delta t})$ is within the cell C5 from the cell ID data. The relay station 300 thus uses the current cell ID of C5. That is, in this case, at the time tn+Δt, it is determined that there is a possibility of the collision of the cell IDs. When it is determined that there is a possibility of the collision of the cell IDs, the change determination unit 360 determines that it is necessary to change the cell ID to another cell ID (e.g., C3 or C4) having no possibility of the collision of the cell IDs.

In addition, instead of extrapolating the movement history, for example, the change determination unit 360 may predict the future position of the relay station 300 by accumulating past movement histories in the storage unit 362 and comparing the current movement path with the past movement histories. When the moving means 3 is the train or the ship that repeatedly moves on a constant path, applying the prediction process is beneficial particularly in terms of enhancing the prediction accuracy.

The storage unit 362 uses the storage medium such as the hard disk or the semiconductor memory to store the cell ID data and the movement history of the relay station 300 described with reference to FIG. 13.

In addition, instead of the relay station 300, an upper node such as the MME may determine the possibility of the collision of the cell IDs described above with reference to FIG. 13. In this case, the relay station 300 periodically reports the position of the relay station 300 detected by the position detection unit 358 to the upper node. The corresponding upper node holds the cell ID data illustrated in FIG. 13. When it is determined that there is a possibility of the collision of the cell IDs, the corresponding upper node then notifies the relay station 300 to that effect, as well as of the other cell ID having no possibility of the collision. The change determination unit 360, upon receipt of the notification, determines that it is necessary to change the cell ID being used (first cell ID) to the notified other cell ID (second cell ID).

3-2. Process Flow

Figure 14:
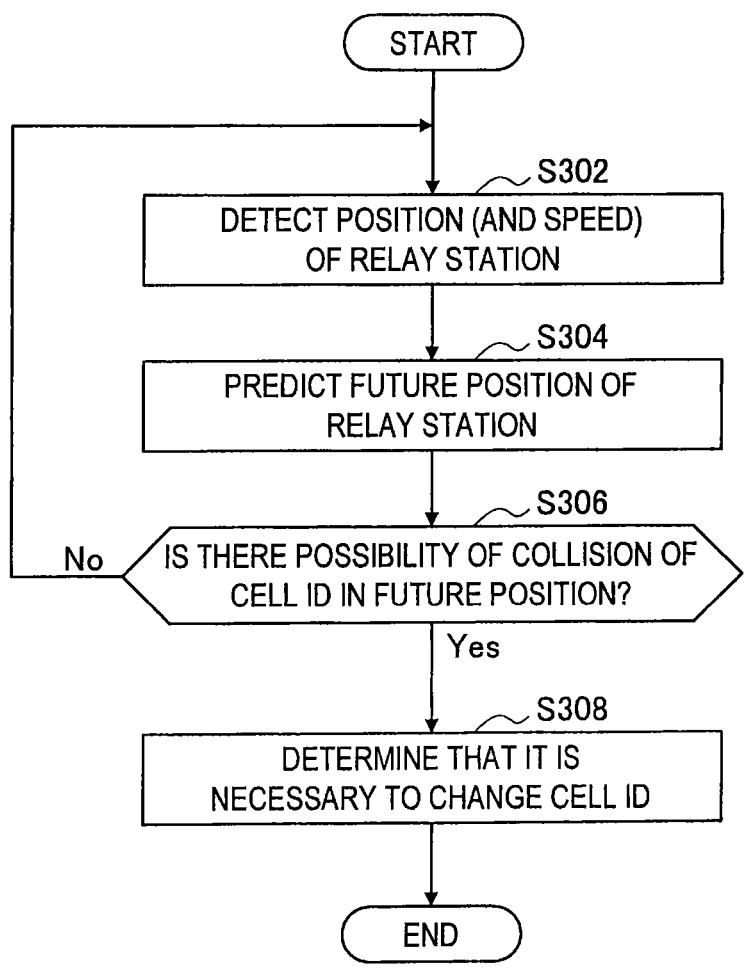
FIG. 14 is a flowchart illustrating an example flow of a cell ID change determination process according to the second embodiment.

FIG. 14 is a flowchart illustrating an example flow of the cell ID change determination process according to the present embodiment.

Referring to FIG. 14, first, the position (and the speed) of the relay station 300 is detected by the position detection unit 358 of the relay station 300 (step S302). The position (and the speed) detected by the position detection unit 358 is stored as the movement history along the time axis. Next, the future position of the relay station 300 is predicted by the change determination unit 360 (step S304). In addition, as described above, predicting the future position of the relay station 300 may be carried out by an upper node such as the MME instead of the change determination unit 360. Next, the change determination unit 360 determines whether or not there is a possibility of the collision of the cell IDs in the future position of the relay station 300 (step S306). Here, when there is no possibility of the collision of the cell IDs, the process returns to step S302. On the other hand, when there is a possibility of the collision of the cell IDs, the change determination unit 360 determines that it is necessary to change the cell ID of the relay station 300 to the other cell ID (step S308).

When it is determined in the cell ID change determination process that it is necessary to change the cell ID of the relay station 300 to other cell ID, the changing of the cell ID is then carried out in accordance with the procedure shown in steps S206 to S214 of FIG. 11 under control of the control unit 170 of the relay station 300.

3-3. Summary of Second Embodiment

So far, the second embodiment of the present invention has been described with reference to FIGS. 12 to 14. According to the present embodiment, when it is determined that it is necessary to change the cell ID of the relay station 300 in order to avoid the collision of the cell IDs, the relay station 300 uses the pseudo-handover procedure to cause the cell ID of the access point of the mobile station 10 belonging to the relay station 300 to be changed from the first cell ID to the second cell ID. In this case, although the handover is carried out by each of the mobile stations 10 belonging to the relay station 300, the base station 200 outside the moving means 3 is not involved in the corresponding handover procedure. At least the throughput of the communication service provided by the base station 200 outside the moving means 3 is thus not reduced. In addition, since the handover carried out by the mobile stations 10 belonging to the relay station 300 is the pseudo-handover with no change in an access point, it is possible to change to the fast cell ID by omitting some of the handover procedure (such as measurement and random access).

In addition, in the present embodiment, the possibility of the collision of the future cell IDs is determined based on the position of the relay station 300 detected by the position detection unit 358 and the cell ID data in which the position of the base station 200 and the cell ID are associated with each other. When it is determined that there is a possibility of the collision of the cell IDs, the change determination unit 360 of the relay station 300 determines that it is necessary to change the cell ID of the relay station 300. According to such a configuration, it is possible to carry out the determination on the cell ID change without depending on the correlation value in the synchronization sequence received from the adjacent base station 200. Therefore, since the cell ID is not necessarily changed even when the adjacent base station 200 is changed, it is possible to reduce the frequency of the pseudo-handover and to suppress the throughput of the system from being decreased in comparison with the first embodiment.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

REFERENCE SIGNS LIST

1 Wireless communication system
10 Mobile station
100, 300 Relay station
120 Communication unit
160, 360 Change determination unit (determination unit)
162, 362 Storage unit
170 Control unit
200 Base station

The invention claimed is:

1. A relay station relaying wireless signals between a base station and a mobile station, the relay station comprising:
   circuitry configured to
   relay the wireless signals,
   determine whether or not it is necessary to change a cell ID in order to avoid a collision between a cell ID of the relay station and a cell ID of the base station due to a movement of the relay station, and
   cause a cell ID of an access point of the mobile station belonging to the relay station to be changed from a first cell ID to a second cell ID when the circuitry determines that it is necessary to change the cell ID, wherein the circuitry
   determines whether or not it is necessary to change the cell ID by monitoring a correlation between synchronization sequences and one or more cell IDs in the wireless signals received from nearby base stations, and
   determines that it is necessary to change the first cell ID that is a cell ID being used to the second cell ID that is a cell ID of which a correlation value reaches a maximum after a predetermined time has elapsed from a point of time at which the correlation value in the synchronization sequence of any of the cell IDs reaches the maximum.

2. The relay station according to claim 1,
   wherein the circuitry causes the cell ID of the access point of the mobile station to be changed from the first cell ID to the second cell ID by causing a synchronization signal in which a synchronization sequence corresponding to the first cell ID and a synchronization sequence corresponding to the second cell ID are multiplexed to be transmitted and causing a handover instruction from the first cell ID to the second cell ID to be transmitted to the mobile station.

3. The relay station according to claim 2,
   wherein the circuitry causes relay of the wireless signal using the second cell ID after handover from the first cell ID to the second cell ID by the mobile station is completed.

4. A communication control method using a relay station relaying wireless signals between a base station and a mobile station, the communication control method comprising:
   determining whether or not it is necessary to change a cell ID in order to avoid a collision between a cell ID of the relay station and a cell ID of the base station due to a movement of the relay station; and
   causing a cell ID of an access point of the mobile station belonging to the relay station to be changed from a first cell ID to a second cell ID when it is determined that it is necessary to change the cell ID, wherein the determining
   determines whether or not it is necessary to change the cell ID by monitoring a correlation between synchronization sequences and one or more cell IDs in the wireless signals received from nearby base stations, and
   determines that it is necessary to change the first cell ID that is a cell ID being used to the second cell ID that is a cell ID of which a correlation value reaches a maximum after a predetermined time has elapsed from a point of time at which the correlation value in the synchronization sequence of any of the cell IDs reaches the maximum.

5. A relay station relaying wireless signals between a base station and a mobile station, the relay station comprising:
   circuitry configured to
   transmit the wireless signals to the mobile station,
   determine whether or not it is necessary to change a cell ID by monitoring a correlation between synchronization sequences and one or more cell IDs in the wireless signals received from nearby base stations,
   determine that it is necessary to change a first cell ID that is a cell ID being used to a second cell ID that is a cell ID of which a correlation value reaches a maximum after a predetermined time has elapsed from a point of time at which the correlation value in the synchronization sequence of any of the cell IDs reaches the maximum, and
   cause, when the circuitry determines that it is necessary to change the cell ID, a synchronization signal in which a synchronization sequence corresponding to the first cell ID and a synchronization sequence corresponding to the second cell ID are multiplexed to be transmitted to the mobile station belonging to the relay station and to also instruct the mobile station to carry out handover from the first cell ID to the second cell ID.

6. A communication control method using a relay station relaying wireless signals between a base station and a mobile station, the communication control method comprising:

determining whether or not it is necessary to change a cell ID by monitoring a correlation between synchronization sequences and one or more cell IDs in wireless signals received from nearby base stations;

determining that it is necessary to change a first cell ID that is a cell ID being used to a second cell ID that is a cell ID of which a correlation value reaches a maximum after a predetermined time has elapsed from a point of time at which the correlation value in the synchronization sequence of any of the cell IDs reaches the maximum;

transmitting, when the determining determines that it is necessary to change the cell ID, a synchronization signal in which a synchronization sequence corresponding to the first cell ID and a synchronization sequence corresponding to the second cell ID are multiplexed to the mobile station belonging to the relay station from the relay station; and causing, when the determining determines that it is necessary to change the cell ID, the relay station to instruct the mobile station to carry out handover from the first cell ID to the second cell ID.

* * * * *